(12) United States Patent
Kikuchi (10) Patent No.: US 11,146,701 B2
(45) Date of Patent: Oct. 12, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yukiko Kikuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/020,776

(22) Filed: Sep. 14, 2020

(65) Prior Publication Data
US 2021/0211551 A1   Jul. 8, 2021

(30) Foreign Application Priority Data

Jan. 7, 2020 (JP) .............................. JP2020-000849

(51) Int. Cl.
*H04N 1/00* (2006.01)
(52) U.S. Cl.
CPC ..... *H04N 1/00514* (2013.01); *H04N 1/00498* (2013.01); *H04N 2201/0094* (2013.01)
(58) Field of Classification Search
CPC ........... H04N 1/00514; H04N 1/00498; H04N 2201/0094
See application file for complete search history.

(56) References Cited

U.S. PATENT DOCUMENTS

| | | | |
|---|---|---|---|
| 9,148,532 B2* | 9/2015 | Fallon | H04N 1/00517 |
| 9,936,101 B2 | 4/2018 | Hayashi | |
| 10,367,973 B2 | 7/2019 | Hayashi | |
| 10,701,242 B2 | 6/2020 | Hayashi | |
| 2009/0027700 A1* | 1/2009 | Kim | G06F 3/1243 |
| | | | 358/1.6 |
| 2015/0261481 A1* | 9/2015 | Takenaka | H04N 1/0035 |
| | | | 358/1.15 |
| 2015/0264206 A1* | 9/2015 | Maeda | H04N 1/00506 |
| | | | 358/1.13 |

FOREIGN PATENT DOCUMENTS

JP   6338470   6/2018

* cited by examiner

*Primary Examiner* — Neil R Mclean
(74) *Attorney, Agent, or Firm* — JCIPRNET (57) ABSTRACT

An information processing apparatus includes a processor configured to perform control to initialize an item having a set value related to process execution and displaying if a first operation for initializing the item is performed. The item to be initialized is decided depending on whether an authentication state is an authenticated state where a user is authenticated or an unauthenticated state where the user is unauthenticated.

7 Claims, 7 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-000849 filed Jan. 7, 2020.

BACKGROUND

(i) Technical Field

The present disclosure relates to an information processing apparatus and a non-transitory computer readable medium.

(ii) Related Art

To date, an image processing apparatus that quickly executes a login process for a new user has been proposed (for example, see Japanese Patent No. 6338470).

The image processing apparatus described in Japanese Patent No. 6338470 includes a memory, a display controller, a reception unit, a setting unit, and a logout processing unit. The memory stores display languages for each of users and is capable of storing a display language shared by the users. The display controller displays an operation screen by using a display language stored in the memory. The reception unit receives a login request from a user. The setting unit sets a first display language as a used language used for displaying the operation screen in response to a login process for a first user successfully executed by the image processing apparatus. The first display language is stored in association with the first user. The setting unit also changes the used language from the first display language to a shared display language in response to a logout process for the first user of the image processing apparatus. The logout processing unit causes the first user to log out of the image processing apparatus in response to the receiving of a login request from a second user during the login of the first user to the image processing apparatus.

SUMMARY

Suppose a case where an apparatus is used by a user and is still used by them without user change and where information set in accordance with an initialization operation is initialized regardless of the situation. In this case, even if a set value in an item does not have to be changed, the same value needs to be set again in the item. The setting operation thus leads to an increase in the amount of operations required until a next operation as an intended operation.

Aspects of non-limiting embodiments of the present disclosure relate to an information processing apparatus and a non-transitory computer readable medium that are enabled to reduce the amount of operations for a next operation as compared with a configuration in which all of set values set in accordance with an initialization operation are changed back to initial values regardless of a user authentication state.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided information processing apparatus including a processor configured to perform control to initialize an item having a set value related to process execution and displaying if a first operation for initializing the item is performed. The item to be initialized is decided depending on whether an authentication state is an authenticated state where a user is authenticated or an unauthenticated state where the user is unauthenticated.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described with reference to the drawings. Components having substantially the same functions are denoted by the same reference numerals throughout the figures, and repeated explanation thereof is omitted. Hereinafter, an image forming apparatus is explained taken as an example of an information processing apparatus; however, the information processing apparatus is not limited to the image forming apparatus.

Exemplary Embodiment

Figure 1:
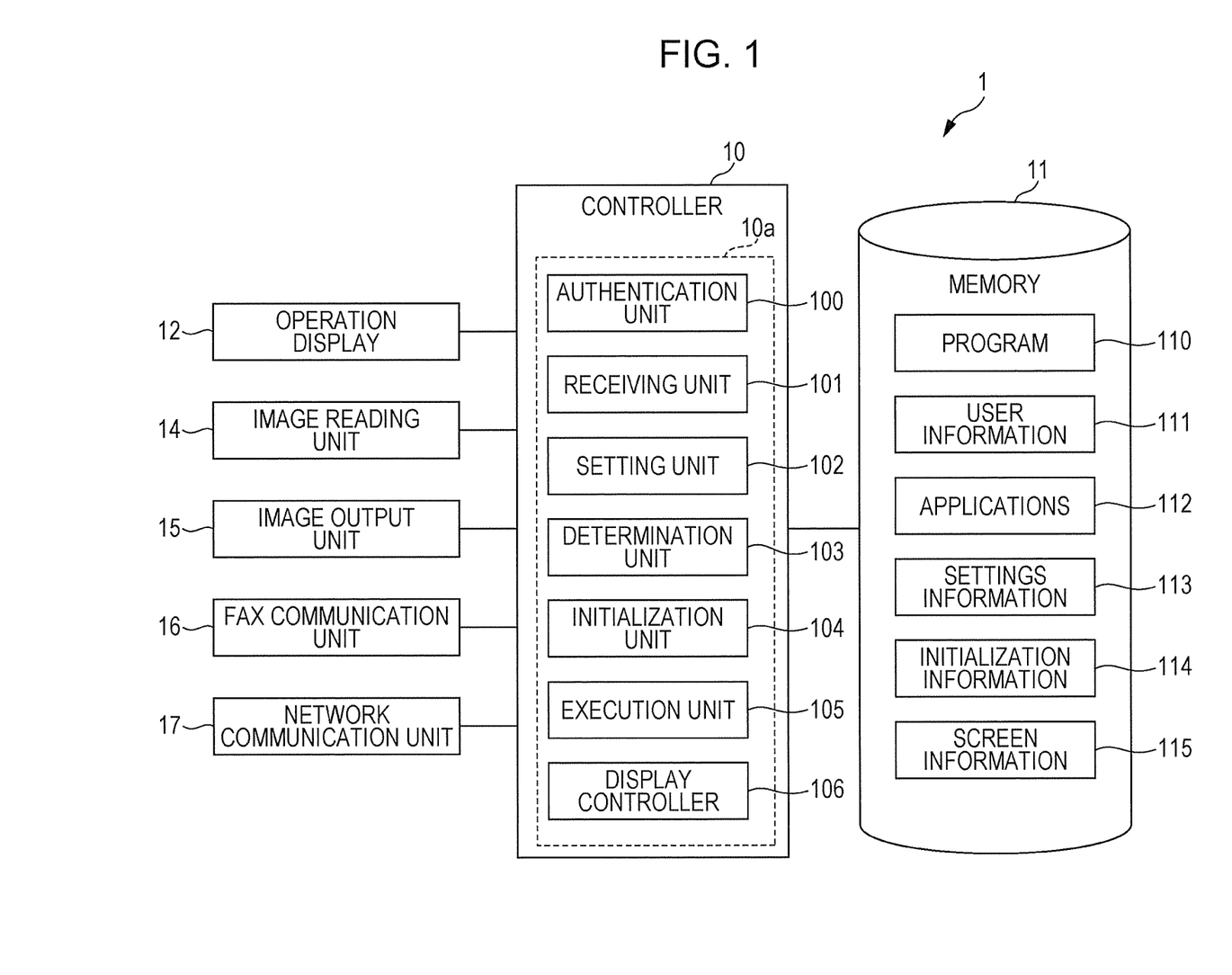
FIG. 1 is a block diagram illustrating an example of the control system of an image forming apparatus according to this exemplary embodiment.

FIG. 1 is a block diagram illustrating an example of the control system of an image forming apparatus according to an exemplary embodiment of the present disclosure. An image forming apparatus 1 is a multi-function printer having multiple functions such as a scanning function, a printing function, a copying function, a faxing function, and an e-mailing function. It suffices that the image forming apparatus 1 includes at least two of the functions above and is not limited to the multi-function printer.

The image forming apparatus 1 includes a controller 10 that controls the components of the image forming apparatus 1, a memory 11 that stores various pieces of data, an operation display 12 that inputs and displays information, an image reading unit 14 that reads an image from a document, an image output unit 15 that prints and outputs an image, a fax communication unit 16 that performs fax transmission/reception, and a network communication unit 17 that communicates with an external apparatus.

The controller 10 includes a processor 10a such as a central processing unit (CPU), an interface, and other components. The processor 10a operates in accordance with a program 110 stored in the memory 11 and thereby functions as an authentication unit 100, a receiving unit 101, a setting unit 102, a determination unit 103, an initialization unit 104, an execution unit 105, a display controller 106, and other units. The details of the units 100 to 106 will be described later.

The memory 11 includes a read only memory (ROM), a random access memory (RAM), a hard disk, and other components and stores the program 110 and various pieces of data such as user information 111, applications 112, settings information 113, initialization information 114 (see FIG. 2), and screen information 115. The details of the user information 111, the applications 112, the settings information 113, the initialization information 114, and the screen information 115 will be described later.

The operation display 12 is, for example, a touch panel display and has a configuration in which a touch panel is disposed on the display such as a liquid crystal display by using polymerization. A keyboard (that is, a software keyboard) is displayed on the display surface of the operation display 12. The software keyboard is an example of an input unit.

The image reading unit 14 reads an image from a document. The image reading unit 14 includes an auto document feeder (not illustrated) installed on the platen glass (not illustrated) and a scanner (not illustrated) and optically reads an image from a document placed on the platen glass or a document fed by the auto document feeder. The image output unit 15 outputs a color image or a monochrome image by printing the color image or the monochrome image on the recording medium such as a paper sheet by using, for example, an electrophotographic system or an inkjet system.

The fax communication unit 16 performs fax communication via a public network (not illustrated) in such a manner as to modulate and demodulate data in accordance with a fax protocol such as G3 or G4. The network communication unit 17 is implemented by using a network interface card (NIC) or the like and transmits and receives information and signals to and from an external apparatus via a network (not illustrated).

Information Stored in Memory 11

The user information 111 is information for authenticating a user and includes, for example, identification information such as a user ID identifying a user and information such as a user name and a password that is compared in authentication.

The applications 112 includes multiple pieces of software implementing various functions of the image forming apparatus 1, such as copying, scanning, printing, faxing, and e-mailing.

In the settings information 113, information indicating an item (hereinafter, also referred to as a setting item) related to the execution of a process related to a relevant one of the above-described various functions and the displaying of a displayed object on the operation display 12 is recorded in association with information indicating a set value (hereinafter, also referred to as a parameter) set in the item.

The initialization information 114 is information listing setting items to be each reset in accordance with an instruction to initialize (hereinafter, also referred to as reset) a corresponding one of the setting items. The term "to reset a setting item" denotes to change a parameter set in the setting item back to a predetermined initial value.

The initialization information 114 is information in which the setting items are recorded after being classified on a per condition basis. Each setting item is reset in accordance with an instruction to reset the setting item given under a predetermined condition. In other words, the initialization information 114 is information indicating classified setting items to be reset in accordance with the resetting instructions given under the respective conditions.

Figure 2:
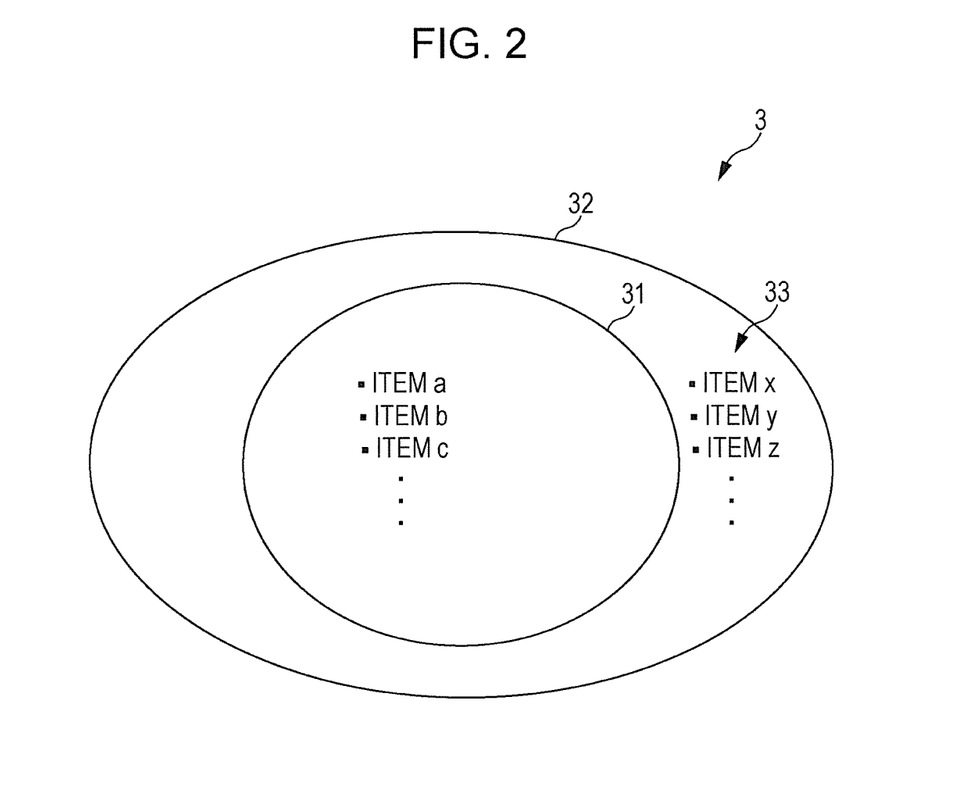
FIG. 2 is a diagram schematically explaining an example of setting item classification.

FIG. 2 is a diagram schematically illustrating an example of setting item classification visualized for convenience of explanation. As illustrated in FIG. 2, a setting item 3 is classified into, for example, a first item 31 (see an item a, an item b, an item c, . . . ) to be reset when a resetting instruction is given under a first condition and a second item 32 (see the item a, the item b, the item c, . . . , an item x, an item y, an item z, . . . ) to be reset when a resetting instruction is given under a second condition.

The first item 31 is included in the second item 32. That is, the number of items in the first item 31 is smaller than the number of items in the second item 32. In other words, the number of items in the second item 32 is larger than the number of items in the first item 31.

A third item 33 (the item x, the item y, and the item z, . . . ) resulting from exclusion of the first item 31 from the second item 32 is not reset when a resetting instruction is given under the first condition. When a resetting instruction is given, for example, under the second condition, the third item 33 is reset together with the first item 31.

The third item 33 includes, for example, an item related to a used language (specifically, an item being related to language selection or language settings, and similar explanation hereinafter being omitted in some cases). Specifically, the third item 33 includes an item related to a language used in displaying on the operation display 12, an item related to a language used for the input unit such as the software keyboard displayed on the operation display 12, and other items.

The first condition includes, for example, a state where the user is authenticated by the image forming apparatus 1 (hereinafter, also referred to as an authenticated state), that is, the user is logged in to the image forming apparatus 1.

The second condition includes, for example, a state where the user is not authenticated by the image forming apparatus 1 (hereinafter, also referred to as an unauthenticated state), that is, the user is not logged in to the image forming apparatus 1.

The resetting instruction is given, for example, by an operation performed by the user on the operation display 12. The operation includes, for example, pressing an operator (for example, a reset button 513 (see FIGS. 3A to 4C)) provided in advance to perform a resetting operation.

In FIG. 2, the first item 31 and the second item 32 are illustrated in such a manner as to be surrounded by ellipses for convenience of explanation; however, note that the shape, the dimensions, and the like of the surrounding do not have a special meaning. The classification into two groups that are the first item 31 and the second item 32 is taken as an example in the description in FIG. 2; however, the number of classification groups is not limited to 2 and may be 3 or more. The first item 31 and the second item 32 do not have to have an inclusion relationship.

The screen information 115 is information regarding various screens displayed on the operation display 12 by the display controller 106 (described later). The screen information 115 includes various pieces of information, for example, for configuring a home screen 5 (see FIGS. 3A to 4C).

Units of Controller 10

The authentication unit 100 authenticates users. Specifically, the authentication unit 100 authenticates a user by comparing a user ID or a password input in a login operation with the user information 111 stored in the memory 11.

The receiving unit 101 receives user operation input from the operation display 12. The user operation received by the receiving unit 101 includes, for example, an operation for logging in (hereinafter, also referred to as a login operation), an operation for setting a set value in the setting item 3 (hereinafter, also referred to as a setting operation), an operation for resetting the setting item 3 (hereinafter, also referred to as a resetting operation), an operation (hereinafter, also referred to as a logout operation) for instruction to terminate authentication (hereinafter, also referred to as logout), and other operations. The resetting operation is an example of a first operation. The logout operation is an example of a second operation.

The setting unit 102 sets a set value in the setting item 3 in accordance with the setting operation received by the receiving unit 101.

The determination unit 103 determines whether the resetting operation received by the receiving unit 101 is performed under the first condition or the second condition. Specifically, the determination unit 103 determines whether the resetting operation is performed in the state where the user is authenticated by the image forming apparatus 1 or in the state where the user is not authenticated by the image forming apparatus 1.

The initialization unit 104 resets the setting item 3 depending on the result of the determination by the determination unit 103. Specifically, the initialization unit 104 initializes a setting item decided depending on whether the authentication state is the state where the user is authenticated or the state where the user is unauthenticated.

More specifically, if the determination unit 103 determines that the resetting operation is performed under the first condition, the initialization unit 104 refers to the initialization information 114 and resets the setting item 3 recorded as the first item 31. If the determination unit 103 determines that the resetting operation is performed under the second condition, the initialization unit 104 initializes all the items (the first item 31 and the third item 33, that is, the second item 32, hereinafter, also referred to as all the setting items) in the setting item 3.

When the receiving unit 101 receives a signal corresponding to an instruction to terminate the user authentication, the initialization unit 104 initializes the second item 32 (that is, all the setting items). The signal corresponding to an instruction to terminate the user authentication includes, for example, a signal related to the logout operation.

The execution unit 105 controls the image reading unit 14, the image output unit 15, the fax communication unit 16, and other units and executes processes in accordance with the set values recorded in the settings information 113. The display controller 106 performs control to display, on the display surface of the operation display 12, an object such as a screen recorded in the screen information 115.

Operations of Exemplary Embodiment

Example operations of the image forming apparatus 1 according to the exemplary embodiment of the present disclosure will be described with reference to screen changes illustrated in FIGS. 3A to 4C. The operations of the image forming apparatus 1 are hereinafter described in such a manner as to be divided into (1) operations performed in the case where the resetting operation is performed under the first condition (that is, the resetting operation is performed in the authenticated state) and (2) operations performed in the case where the resetting operation is performed under the second condition (that is, the resetting operation is performed in the unauthenticated state). In the following description, an item related to a language used in displaying is taken as an example of the third item 33.

1. Operations Under First Condition

Figure 3A:
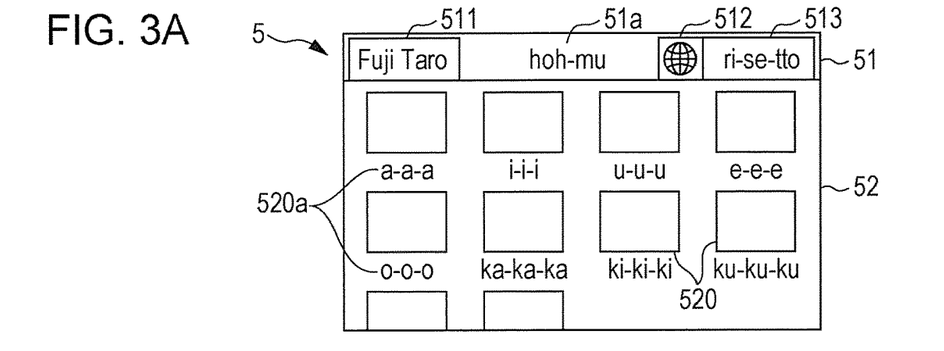
FIGS. 3A, 3B, 3C, and 3D are views explaining example operations performed in a case where a resetting operation is performed in a state where a user is logged in to the image forming apparatus.

FIGS. 3A, 3B, 3C, and 3D are views explaining example operations performed in the case where the resetting operation is performed in the state where a user is authenticated, that is, in the state where the user is logged in to the image forming apparatus 1 and illustrate the flow of the operations in the order of FIG. 3A, FIG. 3B, FIG. 3C, and FIG. 3D. First, the display controller 106 performs control to display the home screen 5 on the operation display 12 as illustrated in FIG. 3A.

When the user performs a login operation on the operation display 12, the receiving unit 101 receives the login operation. The authentication unit 100 authenticates the user. If the authentication unit 100 successfully authenticates the user, the display controller 106 performs control to display the home screen 5 on the operation display 12 as illustrated in FIG. 3A.

The home screen 5 includes, for example, a header area 51 located in the upper part of the home screen 5 and a display area 52 located in the lower part thereof. The header area 51 includes a login button 511 for executing login and displaying the name of a user logged in (see Fuji Taro), a language setting button 512 for setting a language, the reset button 513 for giving an instruction to reset the setting item 3 having a set value set by the user, and the like. In the central portion of the header area 51, a screen name 51a indicating the name of the screen is displayed in the set language.

In the display area 52, execution buttons 520 for giving instructions to set parameters and to perform processing are displayed. Button names 520a assigned to the respective execution buttons 520 are displayed below the execution buttons 520. The home screen 5 is displayed in a first language (for example, Japanese) set as the initial value of the item related to the language used in displaying (see hoh-mu (home), ri-se-tto (reset), and the like).

When the user performs a setting operation by using one of the execution buttons 520, the receiving unit 101 receives the setting operation. The setting unit 102 sets a set value in the setting item 3 in accordance with the setting operation.

When the user performs an operation (hereinafter, also referred to as a language changing operation) for changing the value of the item related to the language used in displaying to a second language (for example, English) by using the language setting button 512, the receiving unit 101 receives the language changing operation. The language changing operation is an example of the setting operation.

In accordance with the language changing operation described above, the setting unit 102 sets the second language in the item related to the language used in displaying. The display controller 106 performs control to display the home screen 5 by using the second language (see Home, Reset, and the like) as illustrated in FIG. 3B.

When the user operates the reset button 513 (see Reset), the receiving unit 101 receives the resetting operation. The determination unit 103 determines whether the user is logged in to the image forming apparatus 1. If the determination unit 103 determines that the user is logged in to the image forming apparatus 1, the initialization unit 104 initializes items in the setting item 3 other than the item related to the language used in displaying. The item related to the language used in displaying is not initialized, and the second language remains as the set value. Accordingly, as illustrated in FIG. 3C, the displaying of the home screen 5 in the second language continues (see Home, Reset, and the like).

Figure 3B:
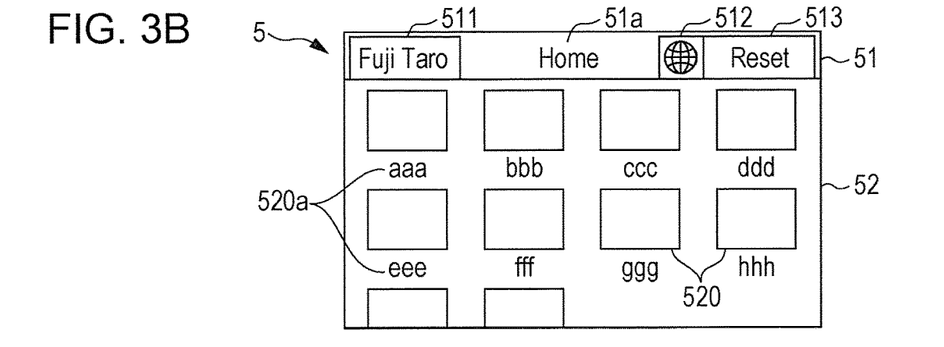
Figure 3C:
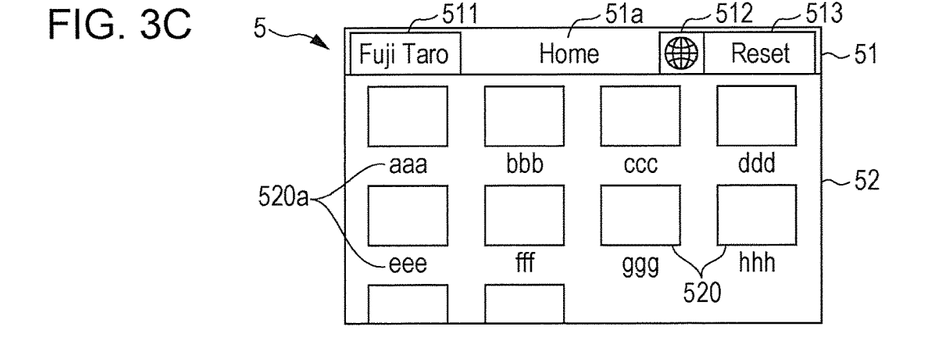

The same displayed items are displayed on the home screen 5 illustrated in FIG. 3B and the home screen 5 illustrated in FIG. 3C, and there is no difference in appearance; however, note that the home screens 5 are different in that parameters other than the initial values are set in items in the setting item 3 other than the item related to the language used in displaying on the home screen 5 illustrated in FIG. 3B, while the initial values are set for all of the setting items other than the item related to the language used in displaying on the home screen 5 illustrated in FIG. 3C.

When the user performs a logout operation, the receiving unit 101 receives the logout operation. The initialization unit 104 initializes all the setting items including the item related to the language used in displaying.

Specifically, if a setting item is not newly set after the state illustrated in FIG. 3C, the initialization unit 104 further initializes the item related to the language used in displaying and causes all of the setting items to be initialized. If any setting item is newly set after the state illustrated in FIG. 3C, the initialization unit 104 further initializes the setting item and the item related to the language used in displaying and causes all of the setting items to be initialized.

Figure 3D:
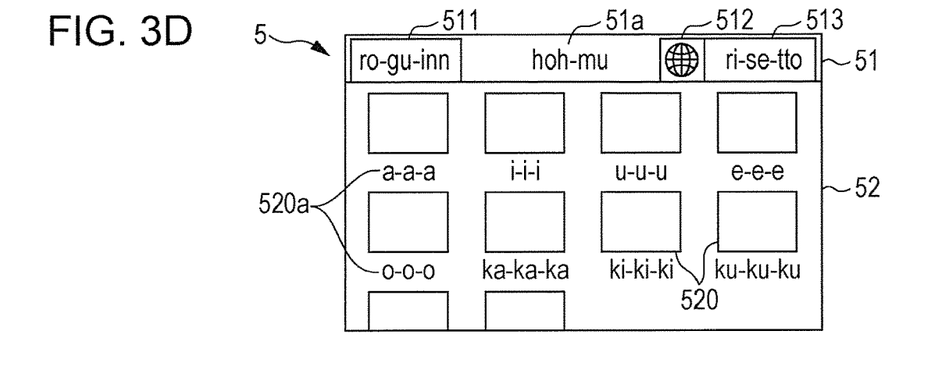

The logout operation causes the value of the item related to the language used in displaying to be changed from the second language back to the first language as the initial value. Accordingly, the display controller 106 performs control to display the home screen 5 by using the first language (see hoh-mu, ri-se-tto, and the like) as illustrated in FIG. 3D.

2. Operations Under Second Condition

Figure 4A:
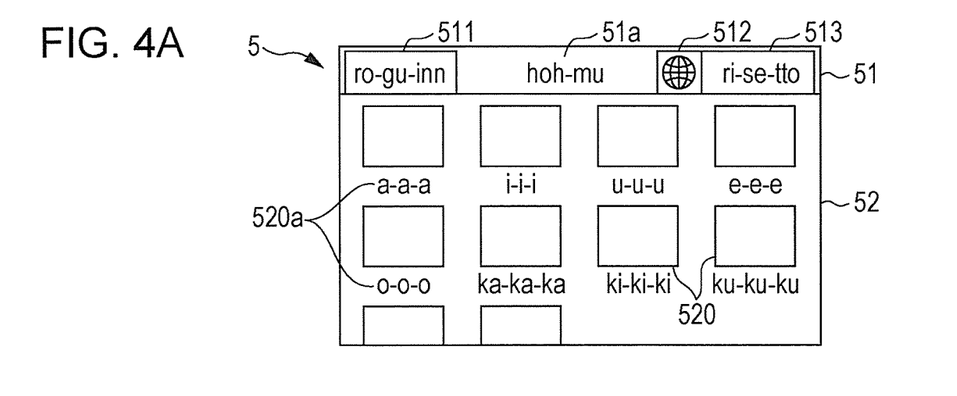
FIGS. 4A, 4B, and 4C are views explaining example operations performed in a case where the resetting operation is performed in a state where the user is not logged in to the image forming apparatus.
Figure 4B:
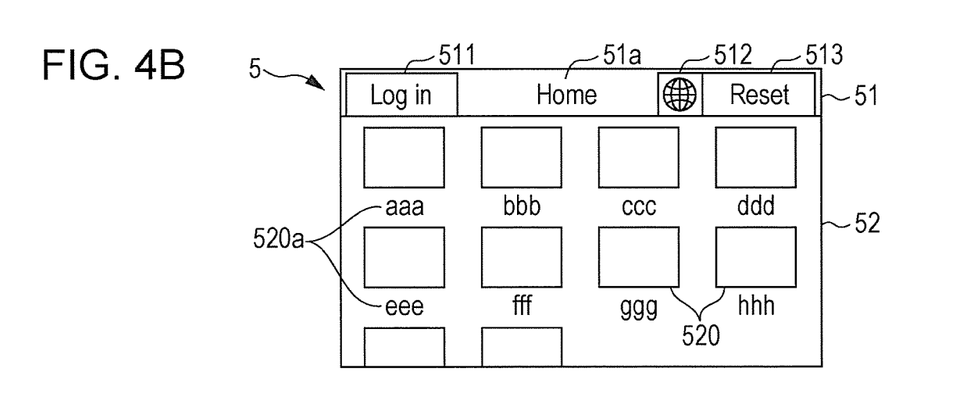
Figure 4C:
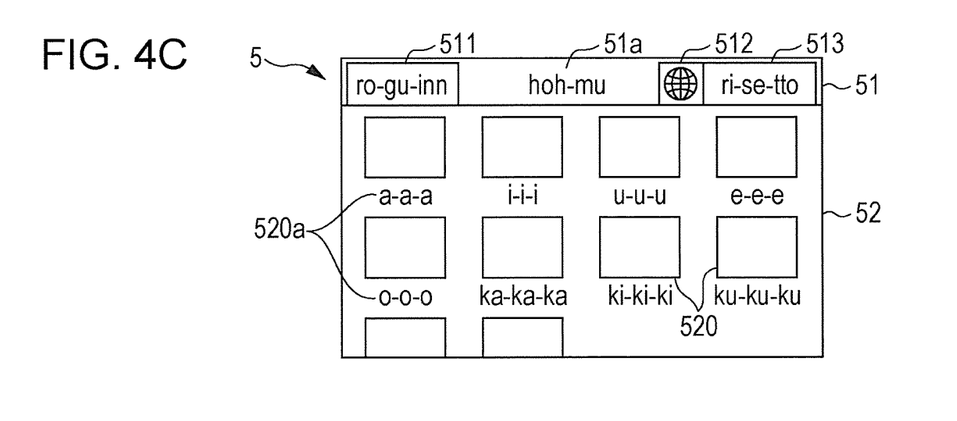

FIGS. 4A, 4B, and 4C are views explaining example operations performed in a case where the resetting operation is performed in the state where the user is unauthenticated, that is, in a state where the user is not logged in to the image forming apparatus 1 and illustrate the flow of the operations in the order of FIG. 4A, FIG. 4B, and FIG. 4C. The display controller 106 performs control to display the home screen 5 on the operation display 12 as illustrated in FIG. 4A. If any user is not logged in, ro-gu-inn (log in) is displayed on the login button 511.

When the user performs a setting operation on one of the execution buttons 520, the receiving unit 101 receives the setting operation. The setting unit 102 sets a set value in the setting item 3 in accordance with the setting operation. For example, if the second language (for example, English) is set in the item related to the language used in displaying by user operation, the display controller 106 performs control to display the home screen 5 by using the second language (see Log In, Home, Reset, and the like) as illustrated in FIG. 4B.

When the user operates the reset button 513, the receiving unit 101 receives the resetting operation. The determination unit 103 determines whether the user is logged in to the image forming apparatus 1. If the determination unit 103 determines that the user is not logged in to the image forming apparatus 1, the initialization unit 104 initializes all the setting items.

The initialization causes the set value of the item related to the language used in displaying to be changed back to the first language that is the initial value. The display controller 106 performs control to display the home screen 5 again in the first language (see ro-gu-inn, hoh-mu, ri-se-tto, and the like) as illustrated in FIG. 4C.

Summarization of Operations

Figure 5:
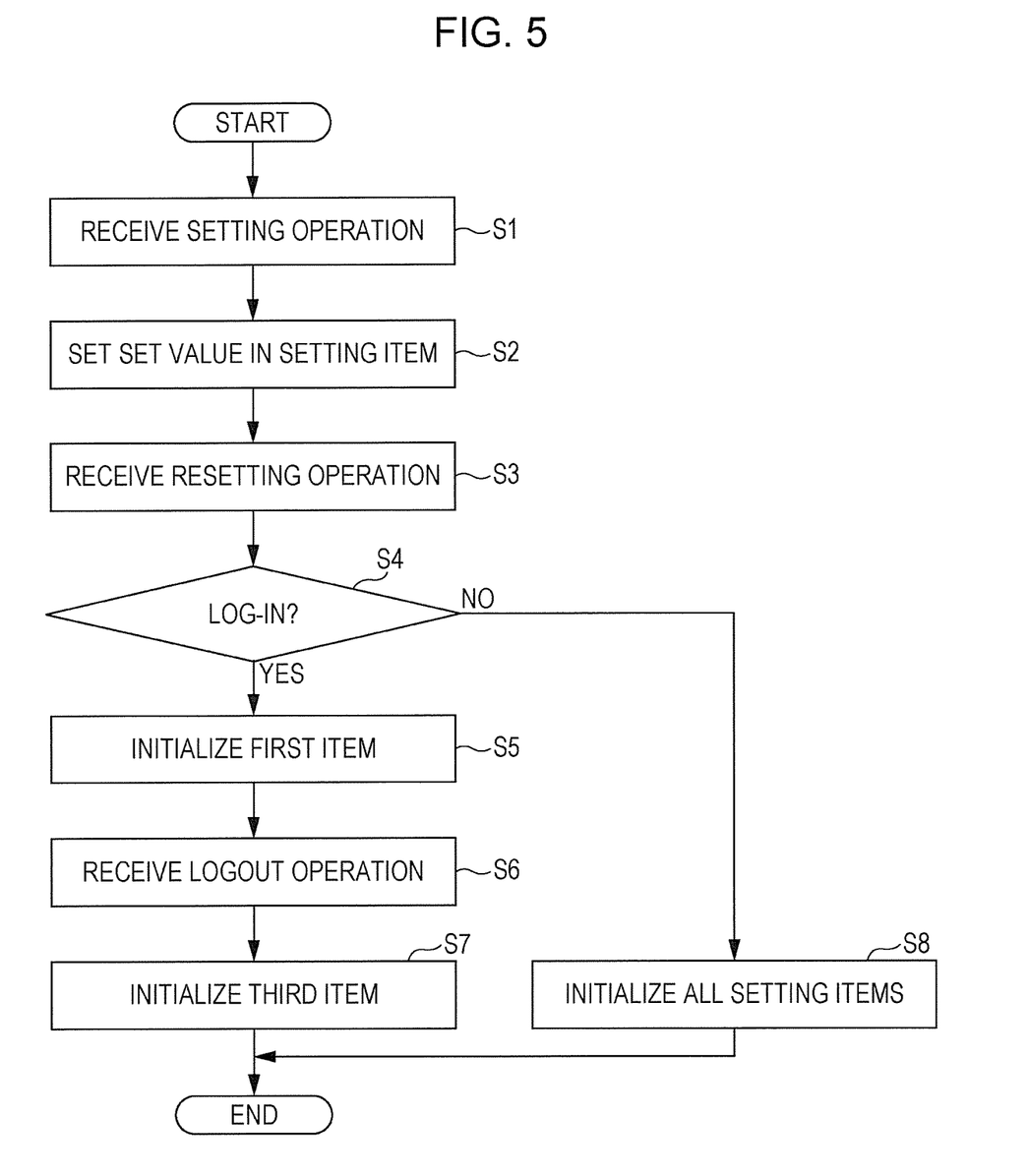
FIG. 5 is a flowchart illustrating example operations of the image forming apparatus according to the exemplary embodiment of the present disclosure.

FIG. 5 is a flowchart illustrating example operations of the image forming apparatus 1 according to the exemplary embodiment of the present disclosure. The operations described with reference to FIGS. 3A to 4C are summarized in FIG. 5. When the user performs a setting operation, the receiving unit 101 receives the setting operation (S1). The setting unit 102 sets a set value in the setting item 3 in accordance with the setting operation (S2).

When the user operates the reset button 513, the receiving unit 101 receives the resetting operation (S3). The determination unit 103 determines whether the resetting operation is performed in the state where the user is logged in to the image forming apparatus 1 or in the state where the user is not logged in (S4).

If the resetting operation is performed in the state where the user is logged in to the image forming apparatus 1 (S4: Yes), the initialization unit 104 initializes items in the setting item 3 (that is, the first item 31) other than the third item 33 (for example, the item related to the language used in displaying) in (S5).

When the user logs out of the image forming apparatus 1, the receiving unit 101 receives the logout operation (S6). The initialization unit 104 initializes the third item 33 (S7). If a set value is newly set after an operation for setting any setting item is performed between step S6 and step S7, the initialization unit 104 further initializes the setting item having the set value newly set. That is, the initialization unit 104 initializes all the setting items.

If the resetting operation is performed in the state where the user is not logged in to the image forming apparatus 1 (S4: No), the initialization unit 104 initializes all the setting items (S8).

Modification

Figure 6:
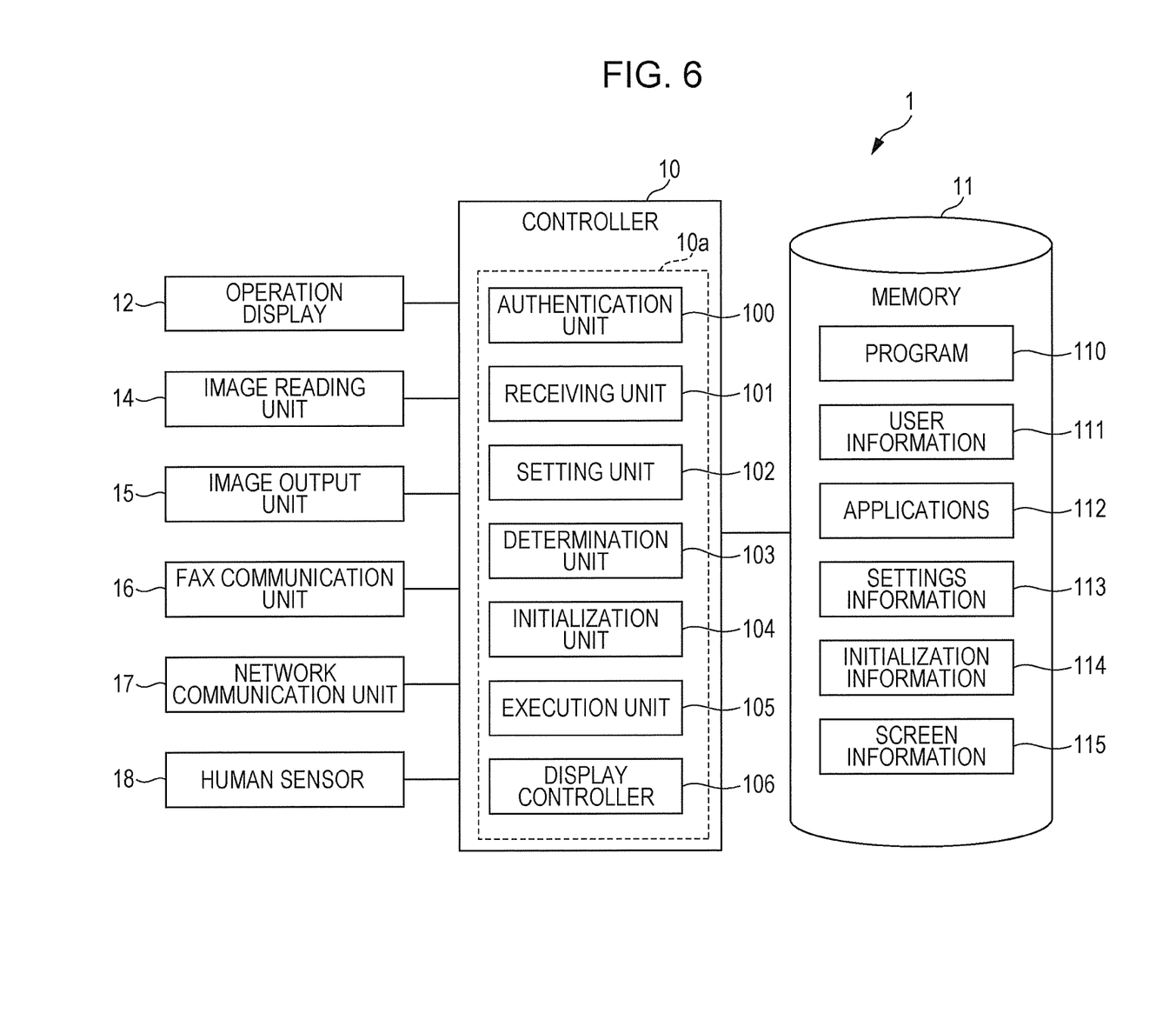
FIG. 6 is a block diagram illustrating an example of the control system of the image forming apparatus according to a modification.

FIG. 6 is a block diagram illustrating an example of the control system of the image forming apparatus 1 according to a modification. As illustrated in FIG. 6, the image forming apparatus 1 may further include, for example, a human sensor 18 that detects approach of a person to the operation display 12. The human sensor 18, for example, measures a distance between a person near the image forming apparatus 1 and the image forming apparatus 1 by using light reflection and thereby detects the proximity of the person to the image forming apparatus 1. The human sensor 18 applies, for example, to a reflective sensor.

Figure 7:
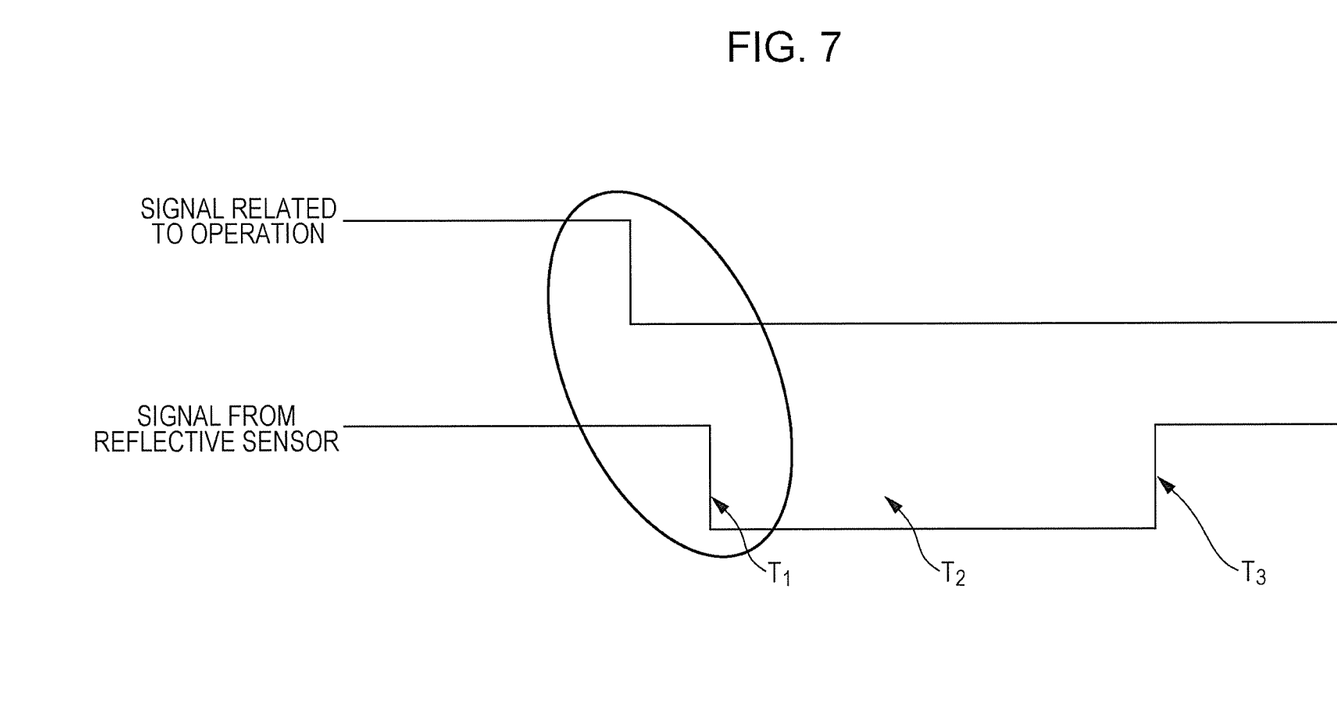
FIG. 7 is a timing chart schematically illustrating example signals respectively obtained from operations performed on an operation display and a human sensor.

FIG. 7 is a timing chart schematically illustrating example signals respectively obtained from an operation performed on the operation display 12 and the human sensor 18. The example signal related to an operation performed on the operation display 12 is illustrated in the upper part of FIG. 7. The ON state of the signal represents a state where an operation is performed on the operation display 12, and the OFF state thereof represents a state where any operation is not performed on the operation display 12.

The example signal from the human sensor 18 is illustrated in the lower part of FIG. 7. The ON state of the signal represents the presence of a person near the image forming apparatus 1, and the OFF state thereof represents the absence of a person near the image forming apparatus 1. FIG. 7 has the horizontal axis common to the signals.

In the exemplary embodiment above, when the receiving unit 101 receives the logout operation, the initialization unit 104 initializes all the setting items; however, time for the initialization is not limited to the time when the receiving unit 101 receives the logout operation.

For example, as illustrated in FIG. 7, after the signal related to the operation performed on the operation display 12 changes from ON to OFF, and when the signal from the human sensor 18 changes from ON to OFF (see the oval frame and $T_1$), the initialization unit 104 may initialize all the setting items. In other words, after the operation performed on the operation display 12 by the user ends, and when leaving of the user from the image forming apparatus 1 is detected, the initialization unit 104 may initialize all the setting items.

After the signal related to the operation performed on the operation display 12 changes from ON to OFF, and when a predetermined period of time elapses after the signal from the human sensor 18 changes from ON to OFF ($T_1$) (see $T_2$), the initialization unit 104 may initialize all the setting items.

After the signal related to the operation performed on the operation display 12 changes from ON to OFF, and when the signal from the human sensor 18 changes again from OFF to ON after the signal from the human sensor 18 changes from ON to OFF (see $T_3$), the initialization unit 104 may initialize all the setting items. In other words, after a user ends an operation of the operation display 12 and leaves the image forming apparatus 1, and when the user or a different user approaches the image forming apparatus 1, the initialization unit 104 may initialize all the setting items.

Note that signals instructing the initialization unit 104 to perform the initialization are designed to be output at $T_1$, $T_2$, and $T_3$ described in the example above. Each signal is an example of the signal corresponding to an instruction to terminate the user authentication.

The exemplary embodiment of the present disclosure has heretofore been described. The exemplary embodiment of the present disclosure is not limited to the exemplary embodiment above, and various modifications and implementations may be made without departing from the spirit of the present disclosure.

Part or entirety of each unit of the controller 10 may be configured as a hardware circuit such as a field programmable gate array (FPGA) or an application specific integrated circuit (ASIC). For example, the item related to the language may be set by using a terminal apparatus (not illustrated) connected to the image forming apparatus 1 via a network. In this case, the item related to the language used for the input unit includes an item related to a language for the keyboard of the terminal apparatus. The keyboard is an example of the input unit.

For example, the setting unit 102 may be configured to set the third item 33 on a per user basis. In this case, a list of set items in the third item 33 may be stored in the memory 11 in association with the user information 111.

That is, the third item 33 not initialized by the resetting operation may be customized on the per user basis. In other words, if the resetting operation serving as the first operation for initializing items having set values related to process execution and displaying is performed in the state where the user is authenticated, a specific item of the first item 31 may be initialized, and a set value set in the third item 33 resulting from the exclusion of the first item 31 from the items may be kept. If the first operation is performed in the state where the user is unauthenticated, the first item 31 and the third item 33 (that is, the second item 32) may be initialized.

Some of the components of the exemplary embodiment above may be omitted or changed. An addition, a deletion, a modification, an order change, and the like may be performed on steps in the flow of the processing in the exemplary embodiment without departing from the spirit of the present disclosure. The program used in the exemplary embodiment may be provided in such a manner as to be recorded in a recording medium such as a compact disk read only memory (CD-ROM). The program may be stored in an external server such as a cloud server and may be used via a network.

In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
perform a first control to initialize an item having a set value related to process execution and displaying if a first operation for initializing the item is performed, the item to be initialized being decided depending on whether an authentication state is an authenticated state where a user is authenticated or an unauthenticated state where the user is unauthenticated,
wherein if a signal corresponding to an authentication termination instruction given by the user is received in the authenticated state, the processor performs a second control to initialize a second item.

2. The information processing apparatus according to claim 1,
wherein the item includes a first item to be initialized by a first operation in the authenticated state and the second item to be initialized by the first operation in the unauthenticated state, and a count of the first item is lower than a count of the second item.

3. The information processing apparatus according to claim 2,
wherein a third item left after the first item is excluded from the second item includes an item related to a language used in the displaying.

4. The information processing apparatus according to claim 3,
wherein the third item further includes an item related to a setting of the language used for an input unit.

5. The information processing apparatus according to claim 1,
wherein when a second operation for the authentication termination instruction is received from the user as the signal, the processor performs the second control to initialize the second item.

6. A non-transitory computer readable medium storing a program causing a processor to execute a process comprising:
performing a first control to initialize an item having a set value related to process execution and displaying if a first operation for initializing the item is performed, the item to be initialized being decided depending on whether an authentication state is an authenticated state where a user is authenticated or an unauthenticated state where the user is unauthenticated,
wherein if a signal corresponding to an authentication termination instruction given by the user is received in the authenticated state, the processor performing a second control to initialize a second item.

7. An information processing method comprising:
performing a first control to initialize an item having a set value related to process execution and displaying if a first operation for initializing the item is performed, the item to be initialized being decided depending on whether an authentication state is an authenticated state where a user is authenticated or an unauthenticated state where the user is unauthenticated,
wherein if a signal corresponding to an authentication termination instruction given by the user is received in the authenticated state, the processor performing a second control to initialize a second item.

* * * * *